(12) United States Patent
Kowalevicz et al.

(10) Patent No.: US 11,309,964 B1
(45) Date of Patent: Apr. 19, 2022

(54) METHOD TO REDUCE OPTICAL SIGNAL FADING IN SIGNAL RECEIVE APERTURE

(71) Applicant: RAYTHEON COMPANY, Waltham, MA (US)

(72) Inventors: Andrew Kowalevicz, Arlington, VA (US); Gary M. Graceffo, Burke, VA (US); Benjamin P. Dolgin, Alexandria, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 17/123,795

(22) Filed: Dec. 16, 2020

(51) Int. Cl.
  H04B 10/2507 (2013.01)
  H04B 10/079 (2013.01)
  H04B 10/40 (2013.01)
  G02B 6/42 (2006.01)

(52) U.S. Cl.
  CPC ....... *H04B 10/2572* (2013.01); *G02B 6/4204* (2013.01); *H04B 10/0795* (2013.01); *H04B 10/40* (2013.01)

(58) Field of Classification Search
  CPC .............. H04B 10/2572; H04B 10/0795; H04B 10/40; G02B 6/4204
  USPC ........................................................ 398/152
  See application file for complete search history.

(56) References Cited

U.S. PATENT DOCUMENTS

| | | | | |
|---|---|---|---|---|
| 5,777,768 A | * | 7/1998 | Korevaar | H04B 10/1127 398/129 |
| 6,868,237 B2 | * | 3/2005 | Willebrand | H04B 10/1125 359/341.1 |
| 9,018,575 B2 | | 4/2015 | Kowalevicz et al. | |
| 9,165,963 B2 | | 10/2015 | Kowalevicz et al. | |
| 9,171,219 B2 | | 10/2015 | Kowalevicz | |
| 9,323,034 B2 | | 4/2016 | Dolgin | |
| 9,400,414 B2 | | 7/2016 | Kowalevicz | |
| 9,451,185 B2 | | 9/2016 | Dolgin et al. | |
| 9,503,660 B2 | | 11/2016 | Kowalevicz et al. | |
| 9,535,245 B1 | | 1/2017 | Kowalevicz | |
| 9,538,096 B2 | | 1/2017 | Dolgin | |
| 9,887,779 B2 | | 2/2018 | Kowalevicz | |
| 9,973,281 B2 | | 5/2018 | Kowalevicz et al. | |
| 10,164,765 B2 | | 12/2018 | Dolgin et al. | |
| 10,177,856 B2 | | 1/2019 | Kowalevicz et al. | |
| 10,205,526 B2 | | 2/2019 | Kowalevicz | |
| 10,225,020 B2 | | 3/2019 | Dolgin et al. | |
| 10,243,670 B2 | | 3/2019 | Kowalevicz et al. | |
| 10,243,673 B2 | | 3/2019 | Dolgin et al. | |
| 10,250,292 B2 | | 4/2019 | Graceffo et al. | |
| 10,256,917 B2 | | 4/2019 | Dolgin et al. | |
| 10,305,602 B2 | | 5/2019 | Dolgin et al. | |
| 10,313,022 B2 | | 6/2019 | Dolgin et al. | |

(Continued)

*Primary Examiner* — Dalzid E Singh

(74) *Attorney, Agent, or Firm* — Lando & Anastasi, LLP

(57) ABSTRACT

Free space optical systems and methods of controlling the same for reducing signal fading of encoded optical beams transmitted in a communication channel are provided. Adjacent pairs of a plurality of apertures are separated by a distance being at least greater than the coherence width of the propagation medium of the communication channel. Due to averaging of the beams, variation in power at an optical receiver is reduced. By using an optical resonator in the optical receiver, the beams are converted into an intensity modulation on a non-interfering basis, thereby permitting recovery and decoding of the signal.

20 Claims, 9 Drawing Sheets

(56) References Cited

U.S. PATENT DOCUMENTS

| | | |
|---|---|---|
| 10,340,965 B2 | 7/2019 | Dolgin et al. |
| 10,374,743 B2 | 8/2019 | Dolgin et al. |
| 10,378,880 B2 | 8/2019 | Dolgin et al. |
| 10,498,464 B2 | 12/2019 | Graceffo et al. |
| 10,530,494 B2 | 1/2020 | Dolgin et al. |
| 10,554,306 B1 | 2/2020 | Graceffo et al. |
| 10,571,774 B2 | 2/2020 | Graceffo et al. |
| 10,637,580 B2 | 4/2020 | Dolgin et al. |
| 10,686,533 B2 | 6/2020 | Dolgin et al. |
| 10,714,251 B2 | 7/2020 | Dolgin et al. |
| 10,826,603 B1 | 11/2020 | Kowalevicz et al. |
| 10,924,189 B2 | 2/2021 | Kowalevicz et al. |
| 11,012,160 B2 | 5/2021 | Kowalevicz et al. |
| 11,101,896 B2 | 8/2021 | Kowalevicz et al. |
| 11,133,873 B1 | 9/2021 | Kowalevicz et al. |
| 11,159,244 B2 | 10/2021 | Graceffo et al. |
| 11,159,245 B2 | 10/2021 | Kowalevicz et al. |
| 2004/0013437 A1* | 1/2004 | Wiltsey ............ H04B 10/2581 398/183 |
| 2006/0159135 A1* | 7/2006 | Cliche ................ H01S 5/0687 372/20 |
| 2016/0043794 A1* | 2/2016 | Ashrafi ............. H04B 7/0671 370/329 |
| 2018/0019807 A1* | 1/2018 | Hreha ............... H04B 7/18513 |
| 2020/0136727 A1 | 4/2020 | Graceffo et al. |
| 2020/0371328 A1 | 11/2020 | Kowalevicz et al. |
| 2020/0403709 A1 | 12/2020 | Graceffo et al. |
| 2020/0409189 A1 | 12/2020 | Graceffo et al. |
| 2021/0006336 A1 | 1/2021 | Kowalevicz et al. |
| 2021/0021351 A1 | 1/2021 | Kowalevicz et al. |
| 2021/0021449 A1 | 1/2021 | Graceffo et al. |
| 2021/0041515 A1 | 2/2021 | Dolgin |
| 2021/0099232 A1 | 4/2021 | Graceffo et al. |
| 2021/0099234 A1 | 4/2021 | Graceffo et al. |
| 2021/0105073 A1 | 4/2021 | Graceffo et al. |
| 2021/0126715 A1 | 4/2021 | Graceffo et al. |
| 2021/0314071 A1 | 10/2021 | Graceffo et al. |

* cited by examiner

METHOD TO REDUCE OPTICAL SIGNAL FADING IN SIGNAL RECEIVE APERTURE

BACKGROUND

Light waves may be made to carry information by modulating a light source, often a laser source, to change various properties of the light, such as its amplitude, phase, frequency, wavelength, etc. The light waves may be in the visible spectral band, the infrared spectral band, or another region of the electromagnetic spectrum. In some cases, an underlying signal may be modulated via amplitude, phase, or frequency modulation, or any combination thereof, and the light source may be modulated by the underlying signal. Optical receivers receive the light waves and measure properties or variations of the light wave, such as the amplitude, phase transitions, and the like, from which the underlying signal and the information may be recovered.

Phase modulation of light signals may convey useful information. Information encoded in phase modulation may include transmitted communication data or may include other information such as information about the source of the optical signal, interaction of the optical signal with a medium (e.g., air), the optical channel through which the optical signal traveled.

SUMMARY

Aspects and embodiments are directed to a method of reducing signal fading in a free space optical system, comprising acts of providing a plurality of transmit apertures, a receive aperture, and an optical resonator coupled to the receive aperture, transmitting each respective optical beam of a plurality of optical beams of an optical signal through each aperture of the plurality of transmit apertures, receiving each transmitted optical beam at the receive aperture, and providing each received optical beam to the optical resonator that produces an intensity-modulated output signal from the received optical beams.

In one example, the method further comprises separating each transmit aperture by a predetermined distance greater than the coherence width of a propagation medium.

In another example, the method further comprises accumulating each received beam in the optical resonator by partially reflecting optical signal energy of each received beam between two semi-reflective surfaces to approach a steady state of accumulated optical energy, outputting optical signal energy from the accumulated optical signal energy having an intensity modulation that is proportional to an average of the accumulated optical signal energy, and detecting the output optical signal energy.

In one example, the method further comprises dividing a total amount of power of the optical signal from at least one optical source between the optical beams to be transmitted through the plurality of transmit apertures.

In another example, the method further comprises evenly distributing the total amount of power between the optical beams to be transmitted through the plurality of transmit apertures, or unevenly distributing the total amount of power between the optical beams to be transmitted by the plurality of transmit apertures.

In one example, the method further comprises receiving data and encoding the optical signal with the data.

In another example, the method further comprises receiving data and encoding each optical beam with the data.

In one example, the method further comprises providing the optical signal with a single source and dividing the optical signal into the plurality of optical beams.

In another example, the method further comprises providing a plurality of optical sources, providing each optical beam of the optical signal by a respective optical source of the plurality of optical sources, determining if each optical source is operating nominally, determining a total number of nominally operating optical sources, and distributing the total amount of power between the transmitted beams of the nominally operating sources.

In one example, the method further comprises increasing the total amount of power between the nominally operating optical sources in response to determining the total number of nominally operating sources is greater than a predetermined value.

Aspects and embodiments are directed to a free space optical system for reducing signal fading comprising a plurality of transmit apertures, a controller configured to transmit each respective optical beam of a plurality of optical beams of an optical signal through each aperture of the plurality of transmit apertures, a receive aperture configured to receive each transmitted optical beam, and an optical resonator configured to produce an intensity-modulated output signal from the received optical beams.

In one example, each transmit aperture is separated by a predetermined distance greater than the coherence width of a propagation medium.

In another example, the optical resonator is further configured to accumulate each received beam by partially reflecting optical signal energy of each received beam between two semi-reflective surfaces to approach a steady state of accumulated optical energy, and output optical signal energy from the accumulated optical signal energy having an intensity modulation that is proportional to an average of the accumulated optical signal energy.

In one example, the system further comprises a controller configured to divide a total amount of power of the optical signal from at least one optical source between the optical beams to be transmitted through the plurality of transmit apertures.

In another example, the controller is further configured to evenly distribute the total amount of power between the optical beams to be transmitted through the plurality of transmit apertures, or unevenly distribute the total amount of power between the optical beams to be transmitted through the plurality of transmit apertures.

In one example, the controller is further configured to receive data and encode the optical signal with the data.

In another example, the controller is further configured to receive data and encode each optical beam with the data.

In one example, the controller is further configured to provide the optical signal with a single source and divide the optical signal into the plurality of optical beams.

In another example, the at least one optical source includes a plurality of optical sources, and the controller is further configured to provide each optical beam of the optical signal by a respective optical source of the plurality of optical sources, determine if each optical source is operating nominally, determine a total number of nominally operating optical sources, and distribute the total amount of power between the transmitted beams of the nominally operating sources.

In one example, the controller is further configured to increase the total amount of power between the nominally operating optical sources in response to determining the total number of nominally operating sources is greater than a predetermined value.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
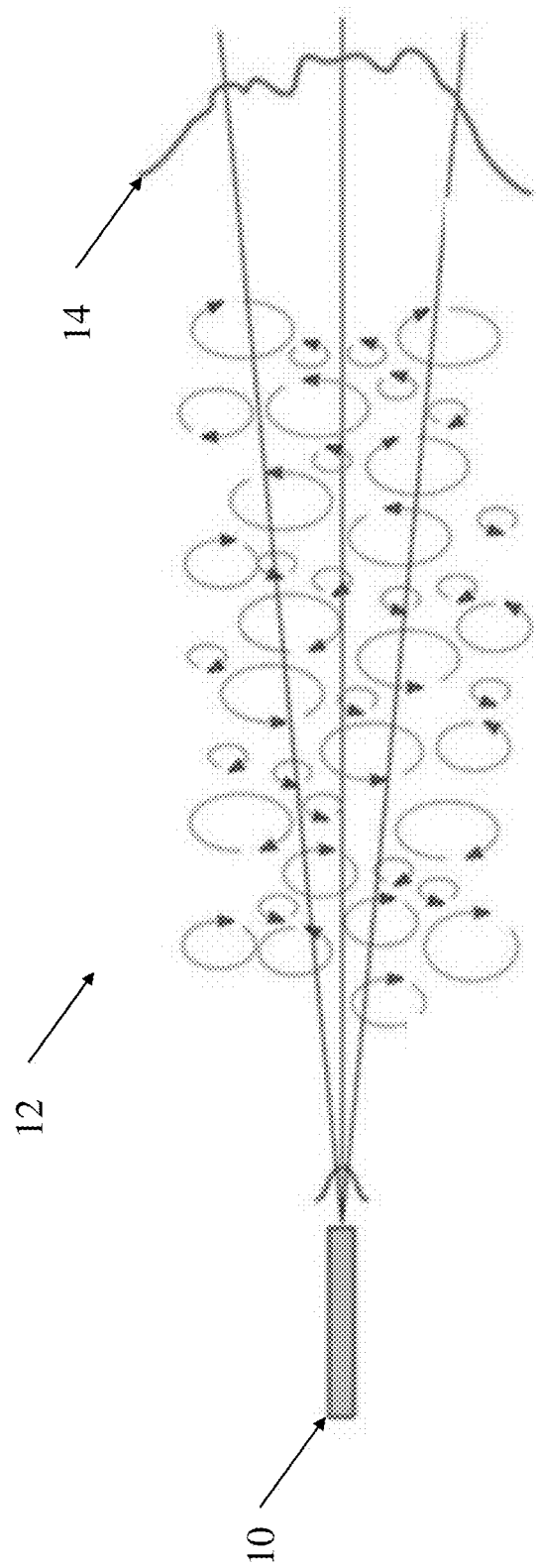
FIG. 1 is an illustration of the effects of turbulence on a received intensity distribution of a single optical beam.

It is to be appreciated that embodiments of the methods and apparatuses discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

For the purposes of this disclosure, and as will be understood by those of skill in the art, the terms light, light signal, and optical signal may be used interchangeably herein and refer generally to an electromagnetic signal that propagates through a given medium, which may be empty space, e.g., a vacuum, or may be an atmospheric, e.g., air, or other medium, such as fiber or other optics components. The terms light, light signal, and optical signal are not meant to imply any particular characteristic of the light, such as frequency or wavelength, band, coherency, spectral density, quality factor, etc., and may include radio waves, microwaves, infrared, visible, and/or ultraviolet electromagnetic radiation, or other electromagnetic radiation conventionally processed in the field of optics.

Free-Space Optical Communication (FSOC) is a technology that allows for extremely high data rates without the need for complex or expensive infrastructure. One disadvantage of FSOC is dealing with atmospheric-induced signal fading, which can cause intermittent and persistent link loss. As a result, users must be amenable to lower effective data rates. Alternatively, when using a single receiver with a coherent waveform, more optical power or larger receiver apertures can be used to keep optical power within desired ranges. Embodiments described herein provide methods and systems to reduce signal fading without the need for either of these existing techniques, thus keeping transmit power nominal and receiver complexity low.

There are several generally accepted approaches to reducing link outages due to signal fading. One approach is to transmit more optical power to compensate for signal fading. Unfortunately, eye safety requirements typically limit the amount of power that can be transmitted and increased transmit power impacts system cost. An additional drawback of this approach is that increasing power does not reduce the dynamic nature of the received signal or the dynamic range requirements of the receiver. Another approach is to increase aperture size, which does increase the average power and reduce the dynamic range requirements of the receiver, but at the cost of a larger receiver telescope, which may limit applications. Multiple receivers can be used, but this significantly increases cost. Finally, for intensity modulated signals, multiple transmit apertures can be used. This allows for an averaging of the received power that improves performance, however, this technique cannot be used effectively with coherent receiver technology because of the limitations of adaptive optics.

Despite satisfactory alignment between an optical transmitter and an optical receiver, constantly moving turbulence in a propagation medium can cause the transmitted optical signal to refract before arriving at the receiver, thereby further degrading the signal. Furthermore, conventional FSOC communication channels that use phase modulation rely on a single coherent source of laser radiation to establish communication. Once the laser is not performing at its minimum required level of performance, the channel stops operating.

Signal fading occurs because the propagation medium distorts the wavefront and redistributes power at a given point in the far field. Fading can cause a 20 dB or more change in received power from a single transmitter. To reduce the fading magnitude, while maintaining the same transmit power, receiver aperture size and number, and allow for coherent communication waveforms, embodiments described herein include using multiple transmit apertures and an optical resonator-enhanced receiver. The transmit apertures are separated by more than the coherence width of the medium of the communication channel and the total power is distributed across the transmitter elements. Because of the separation distance, each transmit beam will be affected differently by the medium (e.g., 'seeing' a different propagation medium). Interaction with random variation in the medium will cause the power to be redistributed differently and randomly for each of the beams. Due to averaging of the beams, the variation in received power is significantly reduced without increasing the aperture size of the receiver.

Embodiments described herein provide a solution to the problems described above by leveraging the properties of an optical resonator. An optical resonator is an arrangement of two mirrors, one highly reflective and one partly reflective, that form a standing wave cavity resonator for light waves. Two common types of optical resonators include the use of two facing plane (flat) or spherical mirrors. One example of this type of resonator is a Fabry Pérot optical resonator, or etalon, which uses two opposing flat mirrors. An optical resonator has the benefit of producing a stable output despite receiving multiple incoming optical signals from different transmitters. If the transmitters are separated by more than the coherence width of the propagation medium, then each transmitter effectively encounters a different propagation medium. This separation produces an averaging effect in the arriving wavefront at the optical resonator. As a result, the minimum received power for an array with the total transmit power equal to that of a single aperture should be larger than the minimum received power from the single transmitter architecture.

A consequence of implementing this spatial diversity with multiple transmission beams is increasing the stability in the average power reaching the optical resonator and leveraging the resonator's insensitivities to wavefront distortions. This creates less deviation (i.e., dynamic power variation) for a given power level compared to previous approaches, in addition to reducing the amount of peaking and nulling in the receiver's detected signal. Unlike previous transmitter arrays, the knowledge of individual transmitting laser locations, their exact wavelengths, or their exact orientation on an optical level is not required. Furthermore, embodiments described herein cannot be successfully implemented by adaptive optics systems due to the high rate of optical interference between different wavelengths of light on the detector in the receiver.

To take advantage of the multiple separated transmission beams, an optical resonator-enhanced receiver is used. The optical resonator converts each of the complex communication signals into intensity modulation, on a non-interfering basis. The total signal is then directly detected by a detector in the receiver, which effectively sums the photons of different wavelengths.

FIG. 1 is an illustration of an optical beam produced by a transmitter 10 encountering moving turbulence 12 in the propagation medium resulting in an intensity distribution 14. Due to the dynamic environment, power at the receiver can change dramatically with time. As illustrated, the transmitter 10 emits the optical beam through a single aperture. To mitigate the negative effects of this dynamic environment, according to embodiments described herein, a plurality of transmitters and/or a plurality of transmit apertures are spaced apart by a distance greater than the coherence width of the medium in which transmitted optical beams propagate.

Figure 2:
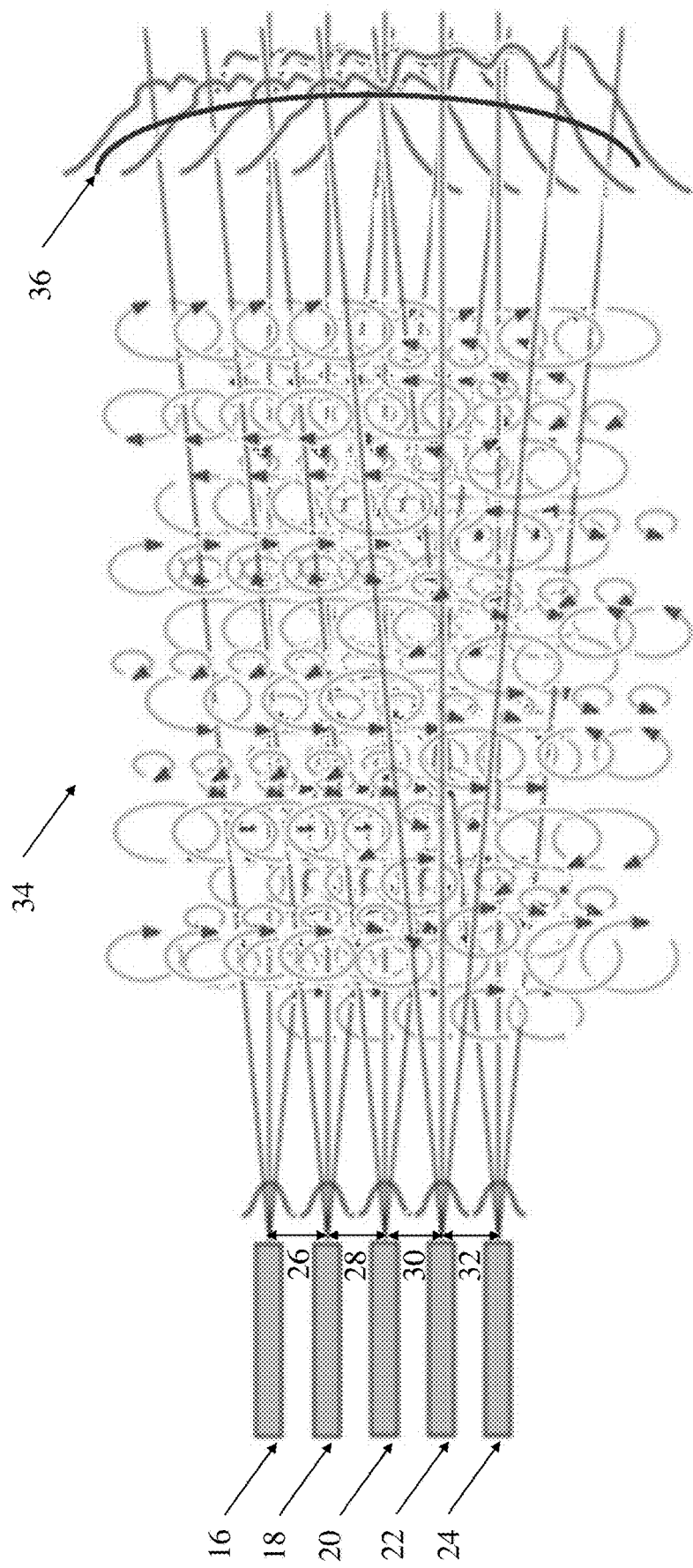
FIG. 2 is an illustration of the effects of turbulence on a received intensity distribution of a plurality of modulated optical beams according to examples described herein.

As illustrated in FIG. 2, each a plurality of transmitters 16, 18, 20, 22, 24 emits an optical beam through the propagation medium (e.g., the Earth's atmosphere). The aperture of the first transmitter 16 is separated from the second transmitter 18 by a distance 26. Likewise, the aperture of the third transmitter 20 is separated from the second transmitter 18 by a distance 28, the aperture of the fourth transmitter 22 is separated from the third transmitter 20 by a distance 30, and the aperture of the fifth transmitter 24 is separated from the fourth transmitter 22 by a distance 32. In certain examples, each of the plurality of transmitters 16, 18, 20, 22, 24 transmits an optical beam through a separate transmit aperture. An optical beam is transmitted from each of the plurality of transmitters 16, 18, 20, 22, 24 and interacts with a random turbulence 34. However, unlike the single transmitter 10 in FIG. 1, the effective intensity distribution 36 has a significantly more stable and uniform level of power. Averaging of the individual distributions reduces fluctuations in power at a receiver by ~Sqrt [x], where x is the number of individual distributions. In some examples, each of the aperture separate distances 26, 28, 30, 32 is greater than the coherence width of the propagation medium.

The coherence width is the propagation distance over which a coherent wave (e.g. an electromagnetic wave) maintains a specified degree of spatial coherence in the propagation medium. According to certain aspects, the propagation medium is the Earth's atmosphere and accordingly, the spatial coherence is defined according to the Fried parameter (i.e., $r_0$), which is a measure of the quality of optical transmission through the atmosphere due to random inhomogeneities in the atmosphere's refractive index. These inhomogeneities are often caused by temperature variations in the atmosphere, thereby causing changes in density. The Fried parameter has units of length and is typically expressed in centimeters.

According to some examples, each of the aperture separation distances 26, 28, 30, 32 is the same. In other implementations, one or more of the distances 26, 28, 30, 32 is different from at least one other of the distances 26, 28, 30, 32, as long as each distance 26, 28, 30, 32 is still greater than the coherence width of the medium of the communication channel. The plurality of transmit apertures enables the reduction in signal fading depth, as implemented in embodiments described herein. It is understood that the principles discussed herein, including that of calculating coherence width, are applicable to embodiments where the communication channel is through a plurality of mediums. In one example, the propagation medium is one of the region of space occupied by satellites in geostationary orbit (GEO), the region of space occupied by satellites in medium Earth orbit (MEO), the region of space occupied by satellites in low Earth orbit (LEO), and the region between ground level and 200 km above the Earth's surface.

Figure 3:
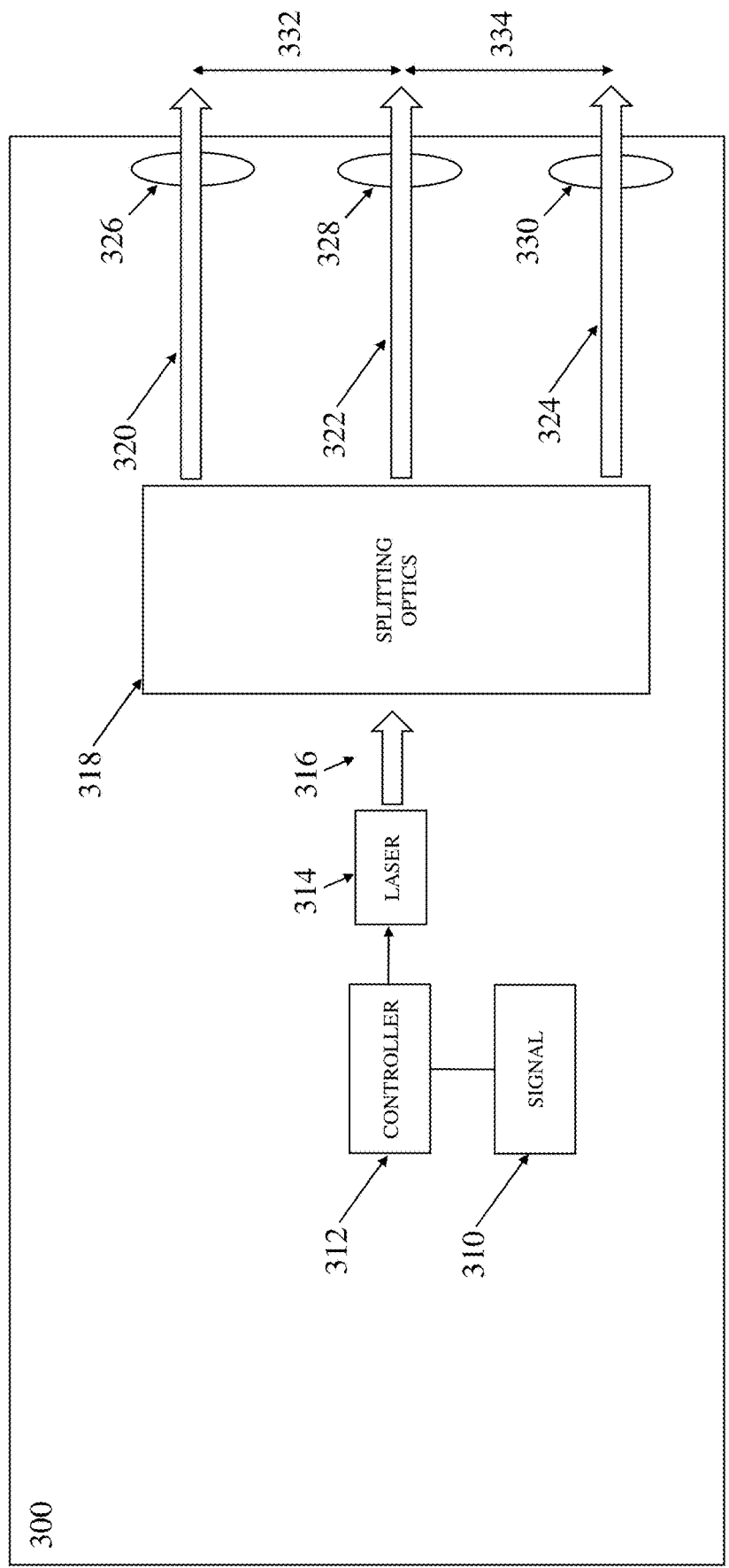
FIG. 3 is a functional block diagram of a single transmitter producing a plurality of optical beams through a plurality of apertures according to examples described herein.

FIG. 3 illustrates a free space optical system 300 for reducing signal fading. The system 300 includes an input optical signal 310, a controller 312, a laser 314, splitting optics 318, first transmission optics 326, second transmission optics 328, and third transmission optics 330. The controller 312 is coupled to the signal 310 to encode data from the signal 310 and coupled to the laser 314 to control the laser 314 to emit a modulated optical beam 316 carrying the encoded data. According to certain aspects the modulated beam 316 is one of a phase-modulated beam, a frequency-modulated beam, and an amplitude-modulated beam. In some examples each of the transmission optics 326, 328, 330 includes lenses, mirrors, and/or a transmit aperture to direct respective optical beams. Certain embodiments include increasing or decreasing the amount of power of the laser 314 or tuning the power of one or more individual transmit apertures of the transmission optics 326, 328, 330 to thereby reduce signal fading depth.

The splitting optics 318 include, in some examples, mirrors and/or non-polarizing beamsplitters to divide the phase-modulated optical beam 316 into a first transmitted optical beam 320, a second transmitted optical beam 322, and a third optical beam 324, each having a fraction of the total power of the phase-modulated optical beam 316. The splitting optics 318 are optically coupled to the first transmission optics 326 to direct the first transmitted optical beam 320 into a common propagation medium towards a target. The splitting optics 318 are also optically coupled to the second transmission optics 328 to direct the second transmitted optical beam 322 into the common medium towards the target. The splitting optics 318 are also optically coupled to the third transmission optics 330 to direct the third transmitted optical beam 324 into the common medium towards the target. In some examples, the target is an optical receiver. According to certain aspects, the transmitted beams 320, 322, 324 each have the same wavelength. Each of the transmission optics 326, 328, 330 directs its respective transmitted beam towards a common target in the common medium and carrying the same data payload.

It is understood that more than the three transmitted optical beams 320, 322, 324 or only two transmitted optical beams are included in embodiments described herein. According to certain embodiments, the distance between each adjacent pair of transmitted optical beams is greater than the coherence width of the medium into which the beams are transmitted. As illustrated in FIG. 3, the first transmitted optical beam 320 is separated from the second transmitted optical beam 322 by a distance 332. Similarly, the second transmitted optical beam 320 is separated from the third optical beam 324 by a distance 334. In some examples, the distance 332 is equivalent to the distance 334.

Figure 4:
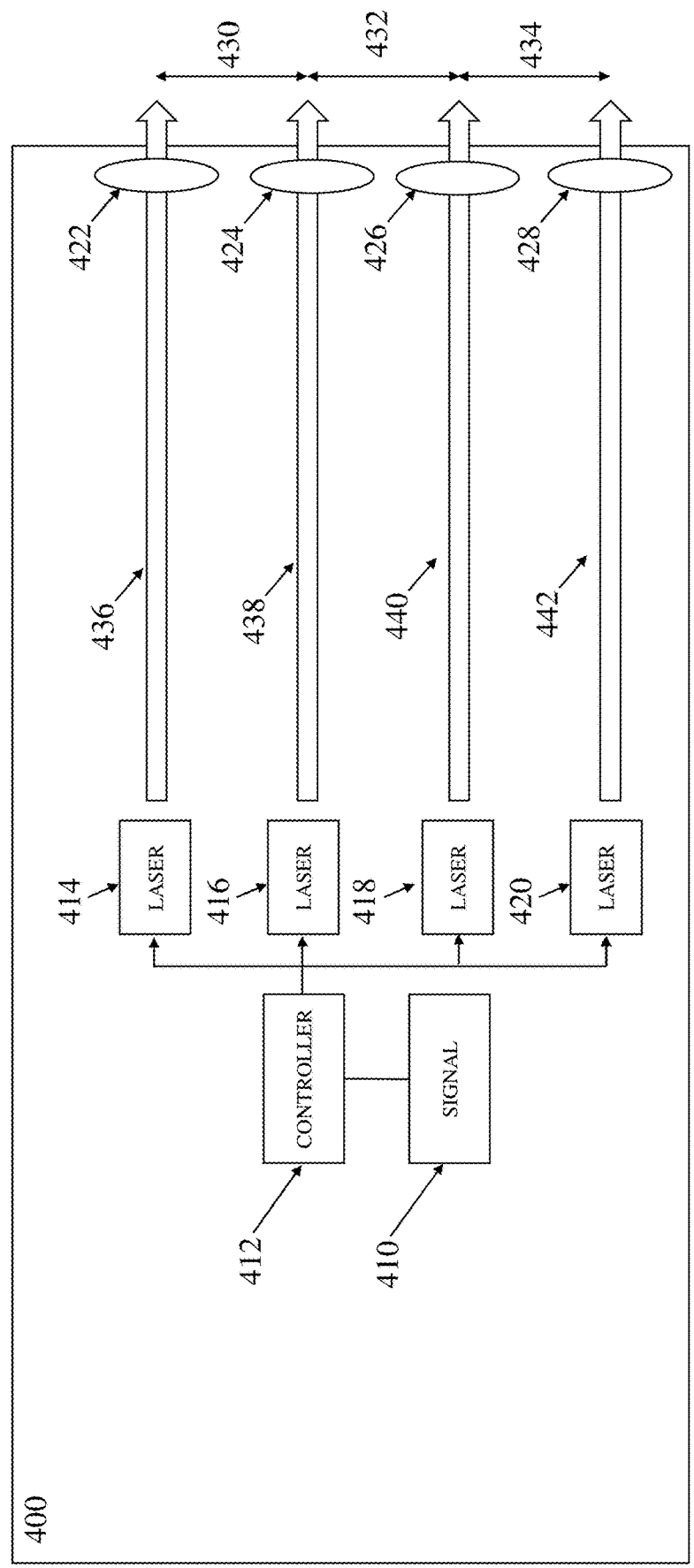
FIG. 4 is a functional block diagram of a plurality of transmitters producing a plurality of optical beams through a plurality of apertures according to examples described herein.

FIG. 4 illustrates a free space optical system 400 for reducing signal fading. The system 400 includes an input optical signal 410, a controller 412, a first laser 414, a second laser 416, a third laser 418, a fourth laser 420, first transmission optics 422, second transmission optics 424, third transmission optics 426, and fourth transmission optics 428. The controller 412 is coupled to the signal 410 to encode data from the signal 410 and coupled to each of the lasers 414, 416, 418, 420 to control each laser to emit a respective modulated optical beam carrying the encoded data. The controller 412 determines the total power required to transmit a single phase-modulated optical beam carrying encoded data from the signal 410 using a single laser and then divides the total power between each of the plurality of lasers 414, 416, 418, 420. By using a plurality of lasers in the free space optical system 400, more total transmit power is available than a similar system having only one laser.

In some examples each of the transmission optics 422, 424, 426, 428 includes lenses, mirrors, and/or a transmit aperture to direct their respective optical beams. The first laser 414 is optically coupled to the first transmission optics 422 to direct a first transmission beam 436 into a common medium towards a target. The second laser 416 is optically coupled to the second transmission optics 424 to direct a second transmission beam 438 into the common medium towards the target. The third laser 418 is optically coupled to the third transmission optics 426 to direct a third transmission beam 440 into the common medium towards the target. The fourth laser 420 is optically coupled to the fourth transmission optics 428 to direct a fourth transmission beam 442 into the common medium towards the target. According to certain aspects, the transmitted beams 436, 438, 440, 442 each have a different wavelength. Each of the transmission optics 422, 424, 426, 428 directs its respective transmitted beam towards a common target in the common medium and carrying the same data payload. According to certain aspects all of the modulated beams 436, 438, 440, 442 are either phase-modulated or frequency-modulated.

It is understood that more than the four transmitted optical beams 436, 438, 440, 442 only three transmitted optical beams, or only two transmitted optical beams are included in embodiments described herein. As illustrated in FIG. 4, the first transmitted optical beam 436 is separated from the second transmitted optical beam 438 by a first distance 430. Similarly, the second transmitted optical beam 438 is separated from the third optical beam 440 by a second distance 432. Similarly, the third transmitted optical beam 440 is separated from the fourth optical beam 442 by a third distance 434. In some examples, the first distance 430 is equivalent to the second and third distances 432, 434. According to certain examples, the distance between each adjacent pair of transmitted optical beams is greater than the coherence width of the medium into which the beams are transmitted (i.e., a propagation medium).

Figure 5:
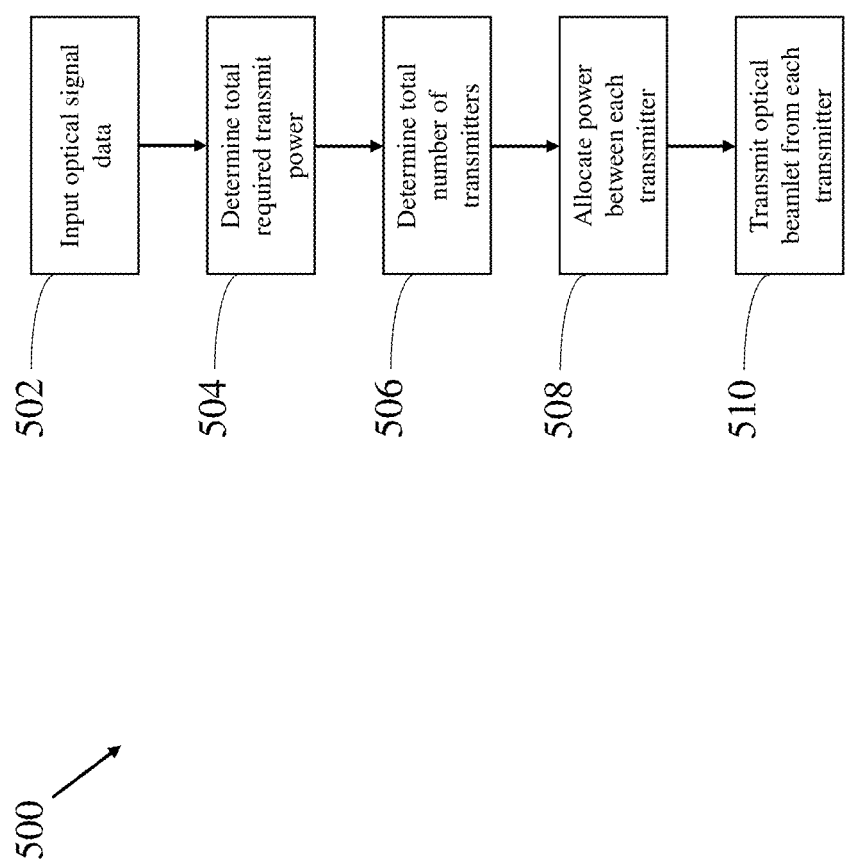
FIG. 5 is a flowchart of a logic process for transmitting a plurality of optical beams according to examples described herein.

To control a plurality of transmitters (e.g., similar to the plurality of transmitters 414, 416, 418, 420 in FIG. 4) in a free space optical system (e.g., system 400), a controller (e.g., similar to the controller 412 in FIG. 4) implements a logic process 500 as illustrated in FIG. 5. The logic process 500 includes an Act 502, an Act 504, and Act 506, an Act 508, and an Act 510. To communicate a payload of data in a modulated optical beam (e.g., similar to the optical beams 436, 438, 440, 442 in FIG. 4) an optical receiver, the controller acquires an optical signal (e.g., similar to the optical signal 410) and extracts data from the optical signal. The data is then encoded into a phase-modulated optical beam to be transmitted. Subsequently, the total amount of power needed to transmit the modulated optical beam is determined in the Act 502. In some examples, the total amount of power is predetermined and the controller retrieves the value of the total amount of power from a memory coupled to the processor. Other examples, the value of total power is available to the controller without having to retrieve it from a memory.

To control signal fading in a free space optical system including one laser and a plurality of transmit apertures (e.g., similar to the system 300), embodiments include systems utilizing a controller (e.g., similar to the controller 312) configured to shut off one or more individual transmit apertures of the plurality of transmit apertures via an optical switch coupled between each transmit aperture and the controller. Alternatively, or in addition, the controller lowers the total power provided to the transmit apertures to mitigate fading.

In the Act 506, the controller determines the total number of transmitters in the free space optical system. In the case of FIG. 4, for example, the controller would determine the total number of transmitters to be 4.

In the Act 508, the controller determines an allocation of the total amount of power for each of the transmitters in the free space optical system. In some embodiments, the controller determines the allocation of total power per transmitter using:

$$P=(1/N)\times(T),$$

where T is the total power, P is the power of a given transmitter (e.g., laser) and N is the total number of transmitters in the free space optical system. In the case of FIG. 4, assuming a total power of 1 kilowatt as an example, the amount of power P in each laser of the free space optical system 400 is (¼)×(1 kilowatt)=0.25 kilowatts or 250 Watts. This technique evenly distributes the power between each transmitter. Alternative techniques for distributing power between the transmitters include uneven distribution of the total amount of power. In an example, the most reliable transmitter or the transmitter having a specific wavelength is allocated 50% of the total power and the remainder of the total power is evenly distributed between the remaining transmitters. It is understood that other implementations of an uneven power distribution are included in embodiments described herein.

In the Act 510 each transmitter in the free space optical system transmits a phase-modulated optical beam carrying the same encoded information as the optical signal processed in the Act 502. Additionally, each beam has the same transmission rate. The array of transmitters in the free space optical system (spaced apart by more than the coherence width of the medium into which they are transmitted) is aligned with an accuracy corresponding to the transmission rate. In embodiments utilizing multiple wavelengths, the transmission is recoverable with time delays between transmitted beams being longer than the corresponding bit width. In embodiments utilizing a single wavelength, the time delays between transmitted beams are required to be less than the bit width.

One advantage to the embodiments disclosed herein is having a laser array with no optical coherency and relatively poor laser alignment (sub-optical level), while still performing as well or better than conventional systems requiring stricter alignment and optical coherency. An additional advantage in using an array of transmitters spaced apart as described above and an optical resonator is the ability to perform a graceful degradation process. Conventional FSO channels explicitly rely on the source coherency, the use of emitting arrays with multiple laser sources that permit graceful degradation is nearly impossible since array introduce additional requirements on laser coherency and stability of phase delays. Thus, in conventional channels arrays introduce additional failure modes. Given an amount of transmission power of a conventional phase modulation-type FSOC system, at nominal operating levels the free space optical systems disclosed herein provide longer range for the same average power as a conventional FSOC system due to less signal fading. Additionally, free space optical systems disclosed herein provide higher average data rates given the same transmission power as a conventional FSOC system. In the event one laser in the conventional phase modulation-type FSOC system deteriorates, the communication channel stops working. Since these conventional FSOC channels explicitly rely on the source coherency, the use of an emitting array with multiple laser sources that permit graceful degradation is practically infeasible since the array introduces additional requirements on laser coherency and stability of phase delays.

Figure 6:
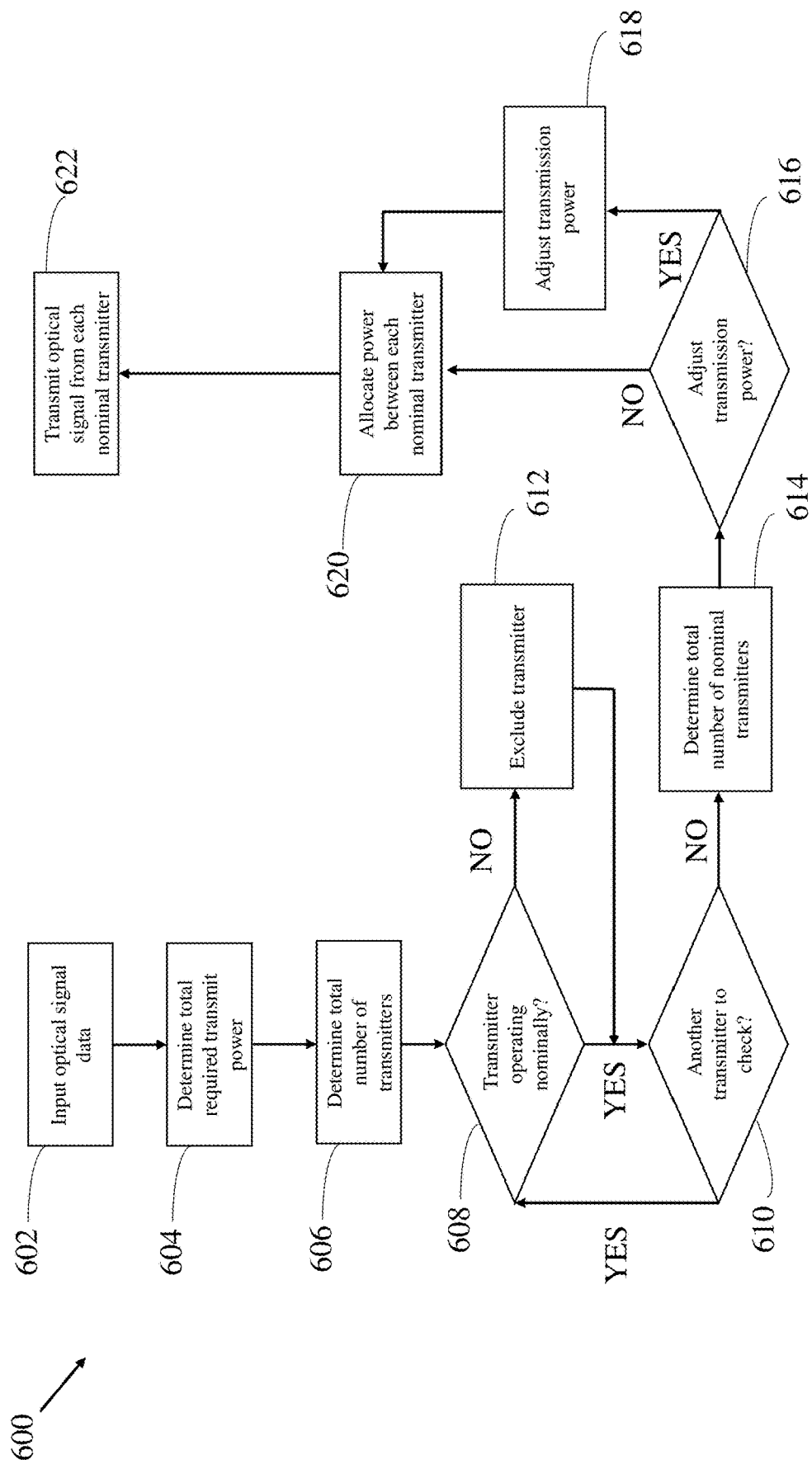
FIG. 6 is a flowchart of a logic process for graceful degradation of an optical signal according to examples described herein.

FIG. 6 illustrates a graceful degradation logic process 600 for reducing signal fading in a free space optical system (e.g., similar to the free space optical system 400 in FIG. 4). The logic process 600 includes the Act 602, the Act 604, the Act 606, the Condition 608, the Condition 610, the Act 612, the Act 614, the Condition 616, the Act 618, the Act 620, and the Act 622. The logic process 600, in some examples, is implemented by a controller (e.g., similar to the controller 412).

The Act 602, the Act 604, and the Act 606 are substantially the same as the Act 502, the Act 504, and the Act 506 respectively. Accordingly, a more detailed description is omitted for the sake of brevity. Following the Act 606, the Condition 608 determines if a first transmitter of the plurality of transmitters counted in the Act 606 is operating within nominal parameters. In some examples, the nominal parameters include one or more of a range of acceptable load drawn from a power source, a range of acceptable operating temperatures, a range of stability in the power drawn from the power source, Scintillation index (SI) of the propagation medium, and the optical absorption of the propagation medium. In response to determining the transmitter is operating nominally, the logic process proceeds to the Condition 610. However, if the transmitter is not operating nominally, then the logic process proceeds to the Act 612, where the transmitter is marked as excluded from further processing and/or signal transmission. Each remaining transmitter in the plurality of transmitters is checked for its present operating condition in the Condition 608 (i.e., YES in the Condition 610). When each transmitter has been processed by the Condition 608, the logic process 600 proceeds to the Act 614. In the Act 614 total number of nominal transmitters is compared to a threshold. In some examples, the threshold is a predetermined threshold indicating a number of total nominal transmitters needed to maintain a current/constant transmission rate. In the event no transmitter is operating nominally (i.e., every transmitter is excluded in the Act 612), the logic process 600 ends.

The Condition 616 determines if the transmission power of each nominally-operating transmitter needs to be adjusted (i.e., increased or reduced) to maintain a constant data/transmission rate and the largest viable transmission range. In an example, the Act 614 determines that every transmitter in the plurality of transmitters processed in the Act 608 is performing nominally. Accordingly, in one example, the Condition 616 will not reduce the transmission power (i.e., NO). With every transmitter operating nominally, the overall transmission range is greater than a conventional system using a single transmitter at the same total power. In another example, in a free space optical system having four transmitters each transmitting at 25% of the total required power, the Act 614 determines that three of the transmitters are operating nominally and a fourth transmitter is not functioning at all or is unreliable (i.e., a predetermined value of 3 nominal transmitters in the Condition 616 when the total number of transmitters is 4). Accordingly, in one example, the Act 620 will increase the power of each of the nominally operating transmitters by (25/3)%, thereby increasing the total power between the nominally operating transmitters, and terminate providing power to the faulty transmitter. After the Condition 616 or the Act 618 is performed, the logic process 600 proceeds to the Act 620. The Act 620 is similar to the Act 508 described above, while also accounting for any excluded transmitters. After the power is allocated, the logic process 600 concludes with the Act 622, which is substantially similar to the Act 510.

Figure 7:
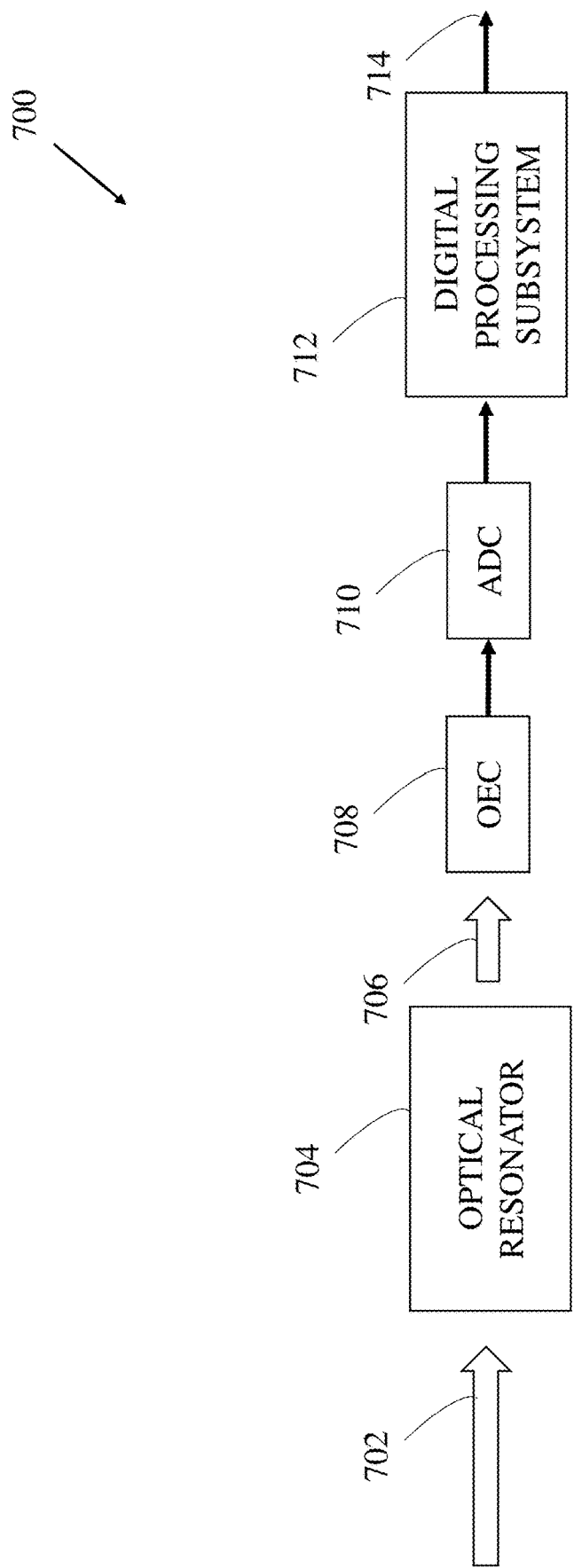
FIG. 7 is a functional block diagram of one example of an optical receiver according to examples described herein.

Referring to FIG. 7, illustrated is an example of an optical receiver 700 according to various examples discussed herein. FIG. 7 is described with continuing reference to the free space optical system 300 of FIG. 3 or the free space optical system 400 of FIG. 4, which may communicate data payloads to the optical receiver 700. Additionally, a receiver and a transmitter may be paired together, e.g., to form a transceiver, capable of bidirectional data communication with another transmitter-receiver pair.

The illustrated receiver 700 receives an optical signal 702 (i.e., a modulated optical beam encoded with data) and includes an optical resonator 704 and a digital processing subsystem 712 that provides an output 714. The optical resonator 704 may be coupled to the digital processing subsystem 712 by an optical-electrical converter 708 and an analog to digital converter 710, for example.

Examples of optical resonators 704 may include Fabry-Perot etalons. The optical resonator 704 is a component capable of sensing transitions, such as phase variations, representative of modulation performed at the transmitter, and transforming the transitions into intensity modulation of an output optical signal, e.g., output optical signal 706. The optical resonator 704 converts the modulation of the arriving optical signal 702 in part by interaction of the arriving optical signal 702 with resonant optical energy built-up in the optical resonator 704.

For example, an etalon is a component having semi-reflective surfaces that may include a transparent material in between, and has one or more characteristic resonant frequencies, each associated with a certain wavelength of light, based upon the spacing (i.e., dimensional length) between the semi-reflective surfaces. The surfaces are semi-reflective and also semi-transmissive, in that they allow some light through, and therefore the arriving optical signal 702 may be allowed into the etalon and may resonate inside the etalon (i.e., between the two semi-reflective surfaces). Additionally, some of the light resonating inside is allowed out of the etalon (through the semi-transmissive surface). Light emerging from the etalon is shown, for example, as the optical signal 706 in FIG. 7.

An optical signal received by an optical resonator 704, an etalon in this example, may establish a steady-state condition in which optical signal energy continuously arrives at the etalon, accumulates or adds to built-up resonating energy existing inside the etalon, and emerges from the etalon at a constant rate. A change in the arriving phase, frequency, or amplitude of the optical signal may disrupt the resonance inside the etalon, and the light intensity emerging from the etalon is also disrupted, until a steady state condition is re-established. Accordingly, a change in phase, frequency, or amplitude of the arriving optical signal 702 causes a change in intensity of the emerging optical signal 706. A large phase transition in the arriving optical signal 702, for example, causes a large (but temporary) intensity change in the emerging optical signal 706. Similar operation occurs in other optical resonators, and accordingly an optical resonator 704 functions as a demodulator, or a modulation converter, for an optical signal 702. The emerging optical signal 706 may therefore carry the same information content as the arriving optical signal 702, but in intensity modulated form.

The emerging intensity-modulated optical signal 706 may be converted to an electrical signal by an optical-electrical converter, e.g., OEC 708, which may include a photodetector, such as a photodiode, for example. Accordingly, the output of the OEC 708 may be an amplitude modulated signal representative of the intensity-modulated optical signal 706, and may be converted to a digital form by an analog to digital converter, e.g., ADC 710. The digital signal is provided to the digital processing subsystem 712 for digital processing. The digital processing subsystem 712 processes the digital signal to receive the information-carrying content of the optical signal 702. The basic operation of the digital processing subsystem 712 is known in the art, and may include, e.g., a correlator, a code generator, processor, or a decoder, but the details of any particular implementation may vary.

In various examples, a receiver in accord with aspects and examples disclosed herein may include additional or fewer optics than discussed above, and may omit or add various components relative to those discussed above. For example, focusing optics may be included to receive the emerging optical signal 706 from the optical resonator 704 and to focus the optical signal 706 on the OEC 708. Certain examples may use analog receiver circuitry and therefore may omit one or more of the ADCs 710. Various examples may include a channel estimator as part of the digital processing subsystem 712 to provide phase rotation or other signal adjustments as may be known in the art.

Figure 8:
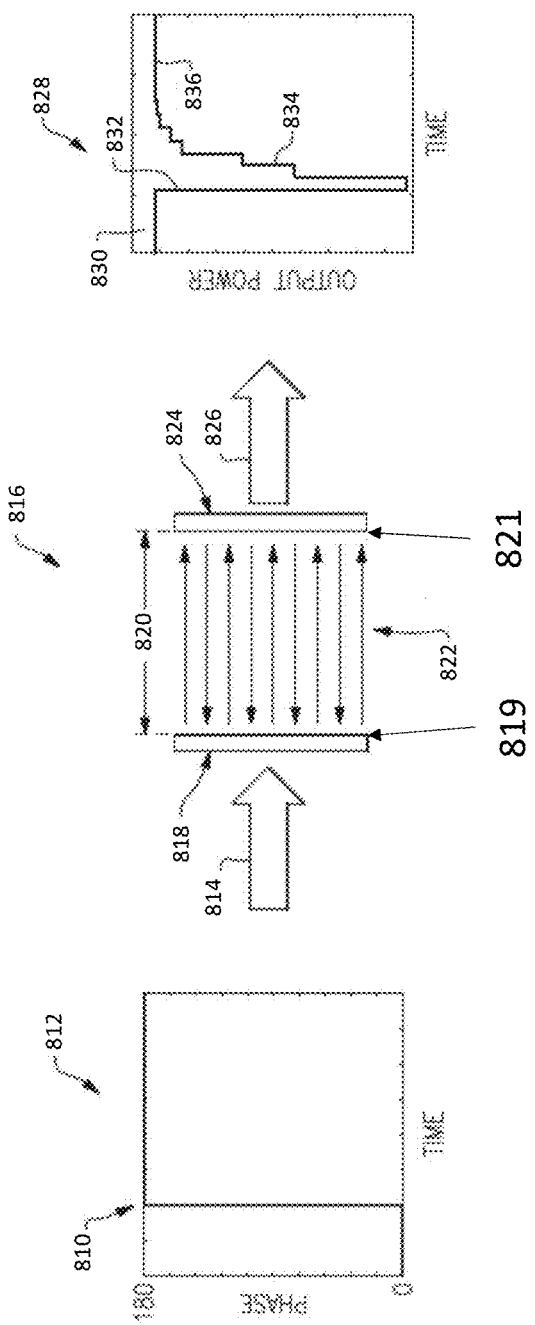
FIG. 8 is a functional block diagram of one example of an optical resonator according to examples described herein.

As discussed above, suitable optical resonators include etalons, and at least one example of an etalon is discussed with respect to FIG. 8, which illustrates an example of an etalon 816 which may be used in various examples of a receiver (e.g., the receiver 700 in FIG. 4 and particularly in the optical resonator 704 therein) in accord with aspects and embodiments described herein. In particular, a receiver may use the etalon 816 to convert phase modulations of a received optical communication signal 814 into intensity or amplitude modulations of an output optical signal 826. The intensity or amplitude modulated output optical signal 826 may then be converted to an electrical signal, with corresponding amplitude variations representative of the phase modulation of the received optical signal 814. The etalon 816 causes the received optical signal 814 to resonantly interact with itself, internal to the etalon 816, such that phase changes in the received optical signal 814 disrupt the resonance and cause amplitude (or intensity) variations at the output optical signal 826, which may be coupled directly to a detector.

In particular examples, the etalon 816 is designed to have a resonant frequency aligned with the source, e.g., a transmit laser, of the received optical communication signal 310. In various examples, a dimensional scale, e.g., length 820, of the etalon 816 is selected such that the etalon 816 exhibits optical resonance at the wavelength of the received optical communication signal 814. In certain examples, such dimensional scales are much shorter than the length of a transmitted symbol, which is the distance traveled by the optical signal between transitions that convey information, e.g., between phase changes in a phase modulated signal.

The etalon 816 includes an interior 304 with semi-reflective surfaces 819, 821 that reflect optical signal energy into the interior 822. An input side 818 allows optical signal energy, such as the optical communication signal 814, into the interior 822. The input side 818 thereby forms an aperture through which the arriving optical communication signal 814 is received. An output side 824 forms an optical output, at least in part by action of the semi-reflective surface 821 to allow a portion of trapped optical signal energy from the interior 822 to emerge as an output optical signal, such as the output optical signal 826. Accordingly, the semi-reflective surface 821 is also semi-transmissive, such that optical signal energy arriving (from the interior 822) at the semi-reflective surface 821 is partially reflected back to the interior 822 and partially transmitted through to the output side 824. The etalon 816 may have varying levels of reflectivity of the semi-reflective surfaces 819, 821. In certain examples, the reflectivity may be expressed as a fraction of light amplitude reflected back into the interior 822, or may be expressed as a fraction of light intensity reflected back into the interior 822. In a particular example, an amplitude reflectivity of the first semi-reflective surface 819 may be $r_1=0.999$ and an amplitude reflectivity of the second semi-reflective surface 821 may be $r_2=0.985$. In other examples the reflectivity of each of the first and second semi-reflective surfaces may be different, and may be any suitable value for a particular implementation. According to certain aspects, the r values are the same. The etalon 816 is one example of a suitable optical resonator in accord with aspects and embodiments described herein.

According to certain examples, an optical resonator, such as the etalon 816, will coherently develop an output signal based on the input signal, and maintain a given level of the output signal until a modulation in the phase of the input signal occurs. When a phase modulation occurs in the input signal, destructive interference causes a phase-dependent change in the amplitude of the output signal. This can be seen in the input phase plot 812 and the output power plot 828 illustrated in FIG. 8. Accordingly, a received phase encoded optical communication signal, such as received optical signal 814, is converted to an amplitude varying signal, such as the output optical signal 826, by the optical resonator, such as the etalon 816. The output optical signal 826 is suitable for direct detection by a sensor, such as the OEC 708 of FIG. 7. Additionally, an optical resonator will function over a broad range of data rates without the need to modify the optical characteristics of the system, such as detector setup, path length adjustments, delay elements, or the like. For example, the ability of the etalon 816 to convert an arriving phase modulated input optical signal 814 into an intensity modulated output optical signal 826 may be independent of the modulation rate at which the input phase is changing, in some examples.

The use of the term "etalon" throughout this disclosure is not intended to be limiting and as used herein may include any of multiple structures, including plates with reflecting surfaces as well as parallel mirrors with various materials in between, and may also be referred to as cavities, interferometers, and the like. Additionally, etalon structures may be formed as a laminate, layer, film, coating, or the like.

FIG. 8 further illustrates operation of the etalon 816 with reference to the output power plot 828 of optical signal intensity (as output power) emerging from an optical resonator, such as the etalon 816, during a phase transition 810 in the received optical signal 814. At point 830 the etalon 816 is in a steady-state resonance condition wherein a steady intensity of light emerges. At point 832 a phase transition 810 occurs in the arriving optical signal 814, temporarily disrupting the steady-state and causing a change in the emerging light intensity. During successive reflections inside the etalon, labeled at point 834, resonance is being re-established and the emerging light intensity increases until, at point 836, a steady intensity of light emerges when the etalon 300 has returned to a steady-state condition.

Accordingly, variation in emerging light intensity from an optical resonator, such as the etalon 816, indicates that a transition occurred in an arriving optical signal, such as a phase, frequency, or amplitude variation, and such may be used by appropriate signal processing to determine useful information by analyzing the emerging light intensity. In the example discussed above and illustrated by FIG. 8, the arriving optical signal 814 is presumed to be phase modulated, but other examples include frequency or amplitude modulation, or any combination of these, and may cause similar variations or other detectable variations in output intensity. In some examples, higher order or more complex modulation may be accommodated by various optical resonator designs.

As a particular example, an etalon tuned to the arriving wavelength reacts to a phase variation in the arriving optical signal in accord with the discussion above and as illustrated in FIG. 8. If the arriving optical signal is modulated with binary phase shift keying (BPSK), for example, the output illustrated in FIG. 8 indicates each phase shift, and accordingly the information carried in the phase shift keying may be recovered from the intensity variations at the output optical signal 826. It should be understood by those of skill in the art with the benefit of this disclosure, that such information recovery is achieved without the necessity for a local coherent clock source or the need to support single-mode coupling, such as to a single mode fiber and delay-line interferometer, to demodulate the arriving optical signal.

In some examples, an etalon may include reflective surfaces (including semi-reflective surfaces) that are not co-planar and/or are not co-linear. For example, an interior reflective surface of an etalon may include some curvature, and an opposing surface may also be curved such that a distance between the two surfaces is substantially constant across various regions of the etalon, in some examples. In other examples, an etalon may have non-linear or non-planar surfaces with varying distances between the surfaces at various regions, and may still function as an optical resonator for various wavelengths and at various regions, suitable for use in examples discussed herein. Accordingly, an etalon may be purposefully designed to conform to a surface, or to have various regions responsive to differing wavelengths, or responsive to differing angles of arrival for a given wavelength, in certain examples.

Figure 9:
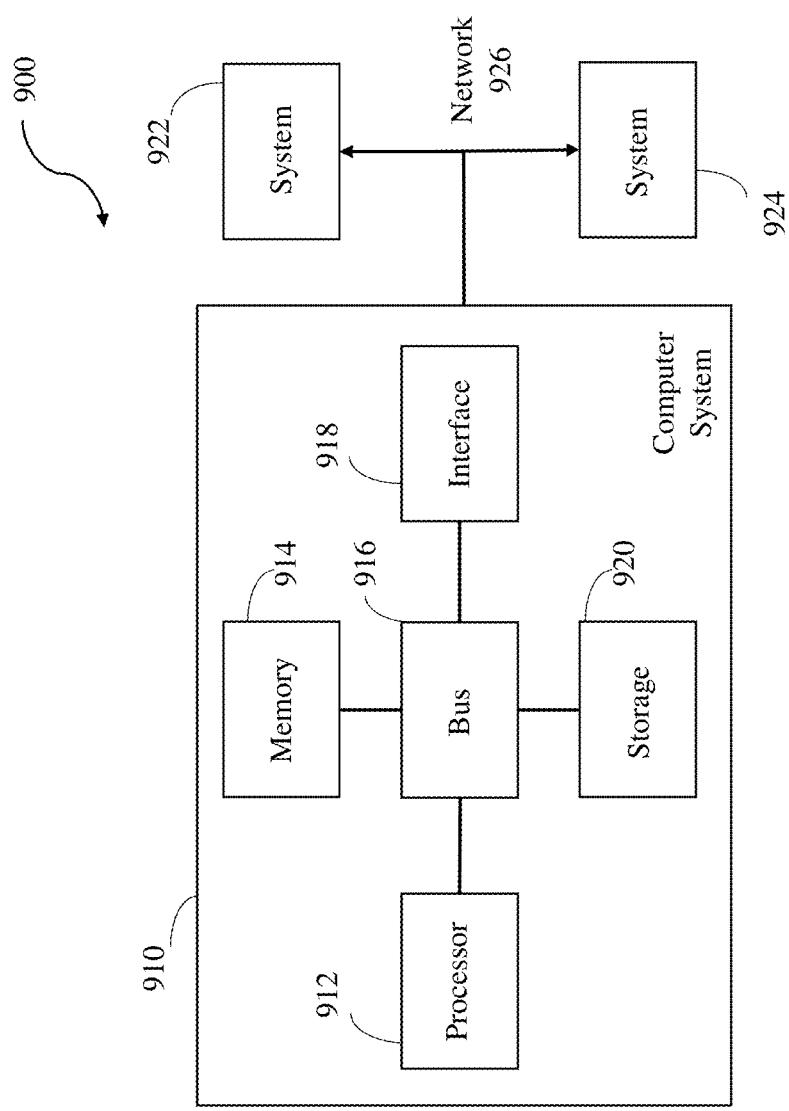
FIG. 9 is a functional block diagram of one example of a processing system that may be used according to examples described herein.

FIG. 9 is a block diagram of a distributed computer system 900, in which various aspects and functions discussed above may be practiced. The distributed computer system 900 may include one or more computer systems. For example, as illustrated, the distributed computer system 900 includes three computer systems 910, 922 and 924. As shown, the computer systems 910, 922 and 924 are interconnected by, and may exchange data through, a communication network 926. The network 926 may include any communication network through which computer systems may exchange data. To exchange data via the network 926, the computer systems 910, 922, and 924 and the network 926 may use various methods, protocols and standards including, among others, token ring, Ethernet, Wireless Ethernet, Bluetooth, radio signaling, infra-red signaling, TCP/IP, UDP, HTTP, FTP, SNMP, SMS, MMS, SS7, JSON, XML, REST, SOAP, CORBA HOP, RMI, DCOM and Web Services.

According to some embodiments, the functions and operations discussed for controlling one or more transmitters (e.g., similar to the laser 314 in FIG. 3 or the lasers 414, 416, 418, 420 in FIG. 4) with a logic process (e.g., similar to the logic process 500 in FIG. 5 or the logic process 600 in FIG. 6) can be executed on computer systems 910, 922 and 924 individually and/or in combination. For example, the computer systems 910, 922, and 924 support, for example, participation in a collaborative network. In one alternative, a single computer system (e.g., 910) can perform a graceful degradation logic process (e.g., similar to the logic process 600). The computer systems 910, 922 and 924 may include personal computing devices such as cellular telephones, smart phones, tablets, "fablets," etc., and may also include desktop computers, laptop computers, etc.

Various aspects and functions in accord with embodiments discussed herein may be implemented as specialized hardware or software executing in one or more computer systems including the computer system 910 shown in FIG. 9. In one embodiment, computer system 910 is a personal computing device specially configured to execute the processes and/or operations discussed above. As depicted, the computer system 910 includes at least one processor 912 (e.g., a single core or a multi-core processor), a memory 914, a bus 916, input/output interfaces (e.g., 918) and storage 920. The processor 912, which may include one or more microprocessors or other types of controllers, can perform a series of instructions that manipulate data. As shown, the processor 912 is connected to other system components, including a memory 914, by an interconnection element (e.g., the bus 916).

The memory 914 and/or storage 920 may be used for storing programs and data during operation of the computer system 910. For example, the memory 914 may be a relatively high performance, volatile, random access memory such as a dynamic random access memory (DRAM) or static memory (SRAM). In addition, the memory 914 may include any device for storing data, such as a disk drive or other non-volatile storage device, such as flash memory, solid state, or phase-change memory (PCM). In further embodiments, the functions and operations discussed with respect to controlling one or more transmitters can be embodied in an application that is executed on the computer system 910 from the memory 914 and/or the storage 920. For example, the application can be made available through an "app store" for download and/or purchase. Once installed or made available for execution, computer system 910 can be specially configured to execute the methods described herein.

Computer system 910 also includes one or more interfaces 918 such as input devices, output devices and combination input/output devices. The interfaces 918 may receive input, provide output, or both. The storage 920 may include a computer-readable and computer-writeable nonvolatile storage medium in which instructions are stored that define a program to be executed by the processor. The storage system 920 also may include information that is recorded, on or in, the medium, and this information may be processed by the application. A medium that can be used with various embodiments may include, for example, optical disk, magnetic disk or flash memory, SSD, NVMe, among others. Further, aspects and embodiments are not to a particular memory system or storage system.

In some embodiments, the computer system 910 may include an operating system that manages at least a portion of the hardware components (e.g., input/output devices, touch screens, cameras, etc.) included in computer system 910. One or more processors or controllers, such as processor 912, may execute an operating system which may be, among others, a Windows-based operating system (e.g., Windows NT, ME, XP, Vista, 7, 8, 10, or RT) available from the Microsoft Corporation, an operating system available from Apple Computer (e.g., MAC OS, including System X), one of many Linux-based operating system distributions (for example, the Enterprise Linux operating system available from Red Hat Inc.), a Solaris operating system available from Sun Microsystems, or a UNIX operating systems available from various sources. Many other operating systems may be used, including operating systems designed for personal computing devices (e.g., iOS, Android, etc.) and embodiments are not limited to any particular operating system.

The processor and operating system together define a computing platform on which applications (e.g., "apps" available from an "app store") may be executed. Additionally, various functions for producing and processing optical signals may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed components, or any combination thereof. Various embodiments may be implemented in part as MATLAB functions, scripts, and/or batch jobs. Thus, the invention is not limited to a specific programming language and any suitable programming language could also be used.

Although the computer system 910 is shown by way of example as one type of computer system upon which various functions for controlling one or more transmitters may be practiced, aspects and embodiments are not limited to being implemented on the computer system, shown in FIG. 9. Various aspects and functions may be practiced on one or more computers or similar devices having different architectures or components than that shown in FIG. 9.

Portions of the disclosure herein make reference to orders of magnitude of distance, e.g., length, and time, e.g., duration, of aspects of light signals, with regard to the length or duration of a segment of light or a wavelength of light. It is to be understood that distance and duration may at times be used interchangeably with respect to light and optical systems, and unless the context implies otherwise, the relationship between distance and duration with respect to light is the speed of light in the medium of propagation. For example, phase relationships are on the order of one wavelength of light, and a wavelength is directly inversely proportional to frequency by the speed of light in the propagation medium. Similarly, segments of light generated by modulation of a light source are on the order of the segment length, which is directly inversely proportional to modulation rate by the speed of light in the propagation medium.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of reducing signal fading in a free space optical system, comprising acts of:
   providing a plurality of transmit apertures, a receive aperture, and an optical resonator coupled to the receive aperture;
   transmitting each respective optical beam of a plurality of optical beams of an optical signal through each aperture of the plurality of transmit apertures;

receiving each transmitted optical beam at the receive aperture; and providing each received optical beam to the optical resonator that produces an intensity-modulated output signal from the received optical beams.

2. The method of claim 1, further comprising separating each transmit aperture by a predetermined distance greater than the coherence width of a propagation medium.

3. The method of claim 1 further comprising:
accumulating each received beam in the optical resonator by partially reflecting optical signal energy of each received beam between two semi-reflective surfaces to approach a steady state of accumulated optical energy;
outputting optical signal energy from the accumulated optical signal energy having an intensity modulation that is proportional to an average of the accumulated optical signal energy; and
detecting the output optical signal energy.

4. The method of claim 1 further comprising:
dividing a total amount of power of the optical signal from at least one optical source between the optical beams to be transmitted through the plurality of transmit apertures.

5. The method of claim 4, further comprising:
evenly distributing the total amount of power between the optical beams to be transmitted through the plurality of transmit apertures; or
unevenly distributing the total amount of power between the optical beams to be transmitted by the plurality of transmit apertures.

6. The method of claim 1, further comprising receiving data and encoding the optical signal with the data.

7. The method of claim 1, further comprising receiving data and encoding each optical beam with the data.

8. The method of claim 1 further comprising providing the optical signal with a single source and dividing the optical signal into the plurality of optical beams.

9. The method of claim 1 further comprising:
providing a plurality of optical sources;
providing each optical beam of the optical signal by a respective optical source of the plurality of optical sources;
determining if each optical source is operating nominally;
determining a total number of nominally operating optical sources; and
distributing a total amount of power of the optical signal between the transmitted beams of the nominally operating sources.

10. The method of claim 9 further comprising increasing the total amount of power between the nominally operating optical sources in response to determining the total number of nominally operating sources is greater than a predetermined value.

11. A free space optical system for reducing signal fading comprising:
a plurality of transmit apertures;
a controller configured to transmit each respective optical beam of a plurality of optical beams of an optical signal through each aperture of the plurality of transmit apertures;
a receive aperture configured to receive each transmitted optical beam; and
an optical resonator configured to produce an intensity-modulated output signal from the received optical beams.

12. The system of claim 11 wherein each transmit aperture is separated by a predetermined distance greater than the coherence width of a propagation medium.

13. The system of claim 11 wherein the optical resonator is further configured to:
accumulate each received beam by partially reflecting optical signal energy of each received beam between two semi-reflective surfaces to approach a steady state of accumulated optical energy; and
output optical signal energy from the accumulated optical signal energy having an intensity modulation that is proportional to an average of the accumulated optical signal energy.

14. The system of claim 11 further comprising a controller configured to divide a total amount of power of the optical signal from at least one optical source between the optical beams to be transmitted through the plurality of transmit apertures.

15. The system of claim 14 wherein the controller is further configured to:
evenly distribute the total amount of power between the optical beams to be transmitted through the plurality of transmit apertures; or
unevenly distribute the total amount of power between the optical beams to be transmitted through the plurality of transmit apertures.

16. The system of claim 15 wherein the controller is further configured to receive data and encode the optical signal with the data.

17. The system of claim 16 wherein the controller is further configured to receive data and encode each optical beam with the data.

18. The system of claim 16 wherein the controller is further configured to provide the optical signal with a single source and divide the optical signal into the plurality of optical beams.

19. The system of claim 16 wherein the at least one optical source includes a plurality of optical sources, and the controller is further configured to:
provide each optical beam of the optical signal by a respective optical source of the plurality of optical sources;
determine if each optical source is operating nominally;
determine a total number of nominally operating optical sources; and
distribute the total amount of power between the transmitted beams of the nominally operating sources.

20. The system of claim 19 wherein the controller is further configured to increase the total amount of power between the nominally operating optical sources in response to determining the total number of nominally operating sources is greater than a predetermined value.

* * * * *